Nov. 16, 1948.　　　G. C. FIELDS　　　2,454,046
MOTOR SCOOTER

Filed Oct. 5, 1945　　　　　　　　　　2 Sheets-Sheet 1

INVENTOR.
GEORGE C. FIELDS
BY
Carlsen + Hagle
ATTORNEYS

Nov. 16, 1948.  G. C. FIELDS  2,454,046
MOTOR SCOOTER
Filed Oct. 5, 1945  2 Sheets-Sheet 2
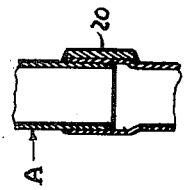
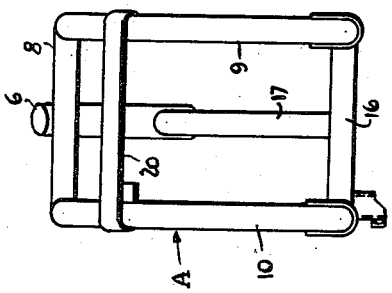
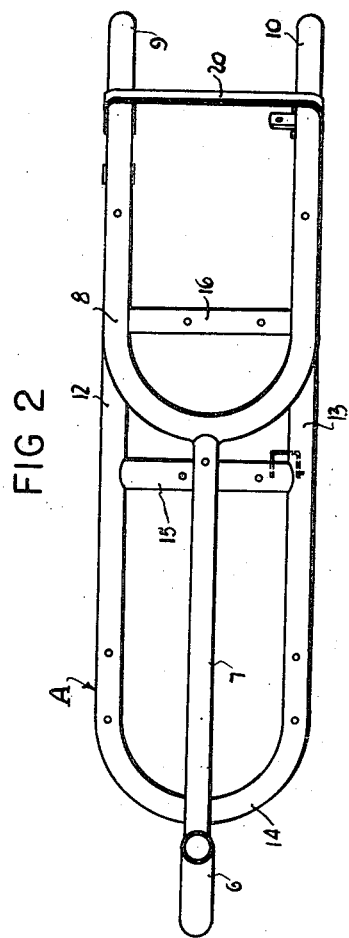
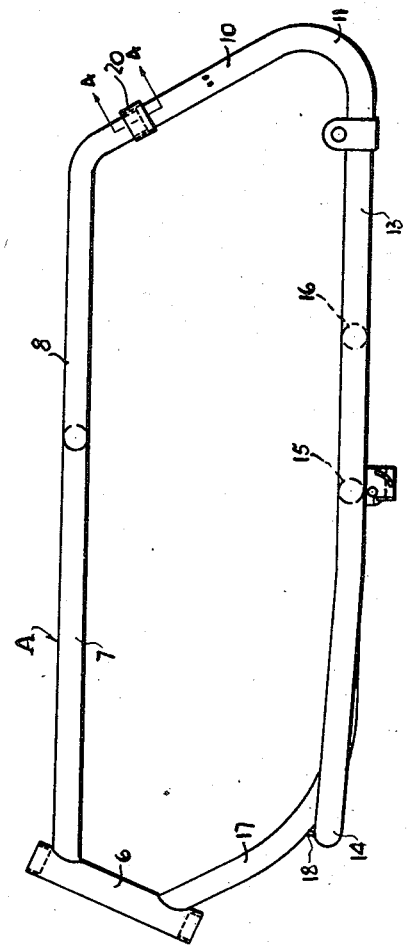
INVENTOR
GEORGE C. FIELDS
BY Carlsen + Hoyle
ATTORNEYS Patented Nov. 16, 1948

2,454,046

UNITED STATES PATENT OFFICE 2,454,046

MOTOR SCOOTER

George C. Fields, Wilmette, Ill., assignor to Solar Corporation, Milwaukee, Wis., a corporation of Delaware Application October 5, 1945, Serial No. 620,427

2 Claims. (Cl. 280—274)

This invention relates to vehicles of the type known as motor scooters, and the primary object is to provide a novel, efficient and practical frame construction for such a vehicle, that is so arranged as to effectively support the motor and operator while also being comparatively light in weight, sturdy, and well proportioned.

Further and more detailed objects will appear in the course of the following specification, reference being had to the accompanying drawings, in which:

Fig. 2 is a top or plan view of the vehicle frame stripped of wheels, motor, seat, and other accessories.

Fig. 3 is a side elevation of the frame shown in Fig. 2.

Fig. 4 is an enlarged detail section on line 4—4 in Fig. 3.

Fig. 5 is a rear end view of the frame, or as seen from the right in Fig. 3.

Figure 1:
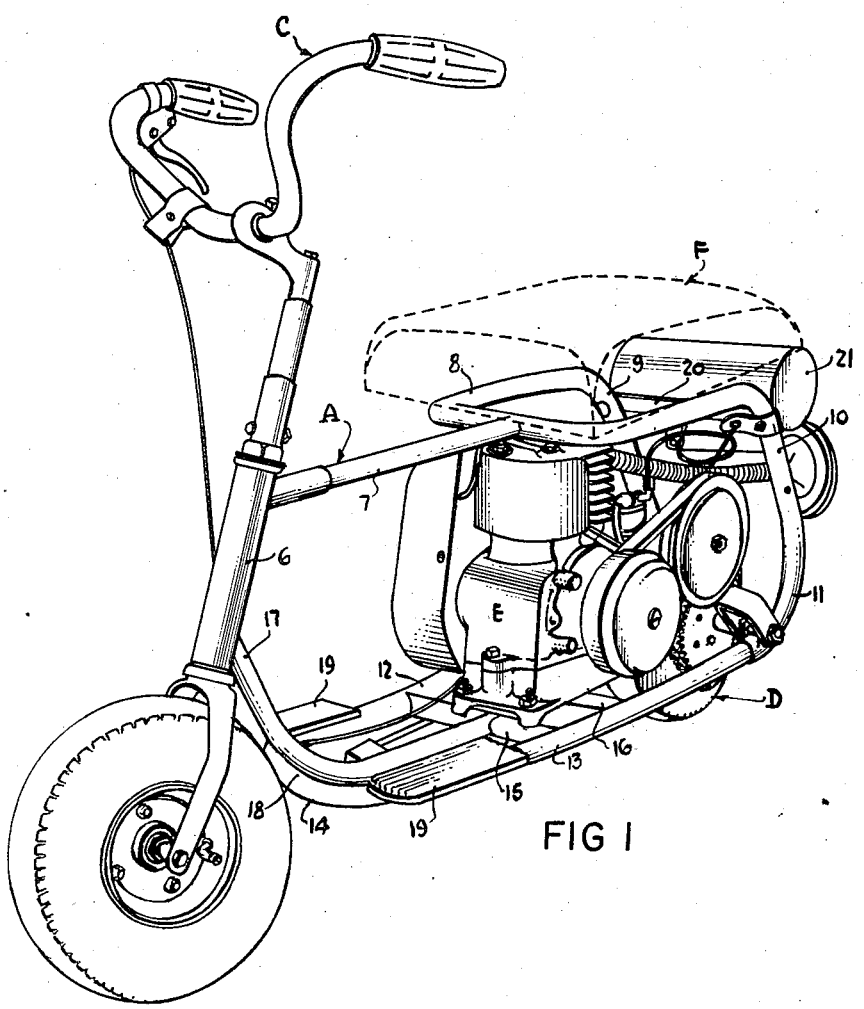
Fig. 1 is a perspective view of a motor scooter embodying my invention, the seat being shown in dotted lines to better disclose the supporting frame parts.

Referring to the drawing more particularly and by reference characters A designates a unitary frame structure supported on front wheel B, controlled by handle bar C, and on rear wheel D, driven by motor E, under the driver's seat F, all as more fully explained in application Serial No. 514,043, issued as Patent No. 2,445,058 on July 13, 1948.

The frame A, preferably formed of pipe or hollow bar sections, all rigidly welded together in a compact rugged unit, includes an inclined, front bearing sleeve 6, from the upper end of which a single central bar 7 extends rearwardly to join a U-shaped horizontal part 8. The arms 9 and 10 of this yoke extend downwardly and rearwardly in substantial parallelism, and then curve under, at 11, to continue forwardly in parallel horizontal bars 12 and 13 that join in an integral loop or bight section 14.

The bars 12 and 13 are rigidly held in spaced positions by cross bars 15 and 16 which also serve as supports for the engine E, and, as will be evident from Fig. 1, the engine is embraced by the bars 8—13 in such a manner as to be substantially protected from damage while also being sufficiently concealed so as not to interfere with free leg movement or the clothes of the operator sitting on seat F, such seat being of course firmly secured on the horizontal yoke formed by bars 8—9—10.

An angular brace bar 17 extends centrally forward from the cross bar 15 and curves upwardly within the bight 14, to which it is welded at 18, and then attaches to the lower end of bearing sleeve 6. This brace bar serves to rigidly connect the under frame parts 12—13—14—15 to the sleeve 6, and it may here be noted that the forward portions of the lateral bars 12 and 13 respectively serve to mount spaced foot supports 19, one at each side of bar 17, and in a most convenient position to receive the feet of the driver when seated on seat F, it being understood that the operator normally sits on the seat with one leg on each side of the upper bar 7. It may here be noted that a separate tie strap 20 may be attached to the rear, inclined parts of bars 9 and 10 to restrain them from relative vibration and this strap may also be used as a fastening means to support the engine fuel tank 21.

It is understood that suitable modifications may be made in the construction as herein set forth without departing from the spirit and scope of the invention as claimed. Having now therefore fully illustrated and described the structure embodying my invention, what I claim to be new and desire to protect by Letters Patent is:

1. In a motor vehicle frame, a lower section comprising transversely spaced, longitudinally extending, horizontal bars forming an engine support near their rear ends and a foot support mounting at their forward ends, the forward extremities of said bars being connected by an integral bight portion, the rear ends of said bars extending upwardly at the rear of the vehicle and thence forwardly in upper horizontal sections so as to form a protecting frame about the engine on its support, and rigidly connected single forward frame bar means extending medially of the vehicle from said protecting frame and from upper and lower points thereof to form a front wheel support for the vehicle, said forward frame bar means including a curved lower bar extending in part coextensive with and between said lower horizontal bars and thence forwardly and upwardly therefrom.

2. In a motor vehicle frame, a lower section comprising transversely spaced, longitudinally extending, horizontal bars forming an engine support at their rear portions and a foot support mounting at their forward portions, the forward extremities of said bars being connected by an integral bight portion, the rear ends of said bars extending upwardly at the rear of the vehicle and thence forwardly in upper horizontal sections so as to form a protecting frame about the engine on its support, and vertically spaced forward frame bar members extending medially of the vehicle from said protecting frame and from upper and lower points thereof to a front wheel support for the vehicle, said forward frame bar members including a curved lower bar extending in part between said lower horizontal bars and thence forwardly and upwardly therefrom, and said curved lower bar being rigidly secured at a point intermediate its ends in cross contact with said bight portion.

GEORGE C. FIELDS.

REFERENCES CITED

The following references are of record in the file of this patent:

FOREIGN PATENTS

| Number | Country | Date |
| --- | --- | --- |
| 11,777a | Great Britain | May 30, 1896 |
| 17,230 | Great Britain | Aug. 5, 1902 |
| 18,531 | Great Britain | Aug. 10, 1897 |
| 509,446 | France | Nov. 9, 1920 |
| 540,548 | France | July 12, 1922 |